H. IRELAND.
CROP CAP OR COVER.
APPLICATION FILED NOV. 7, 1918.
1,321,747.
Patented Nov. 11, 1919.
2 SHEETS—SHEET 1.
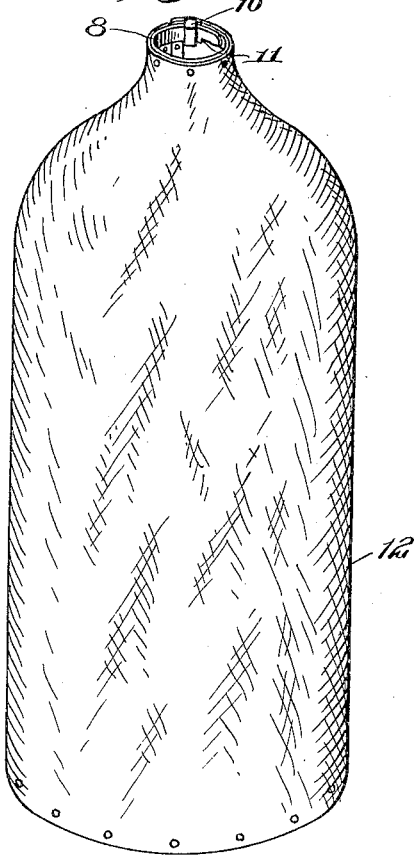
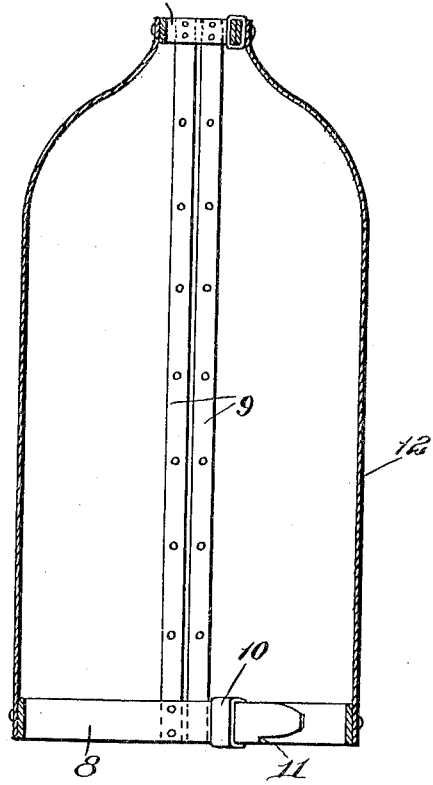
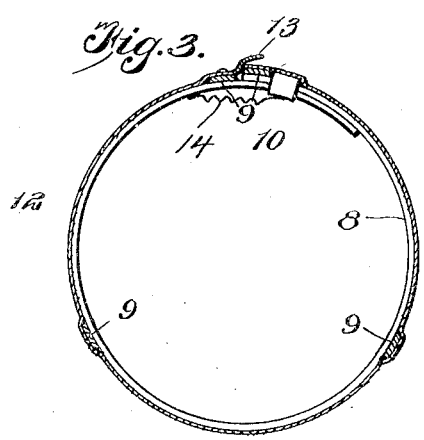
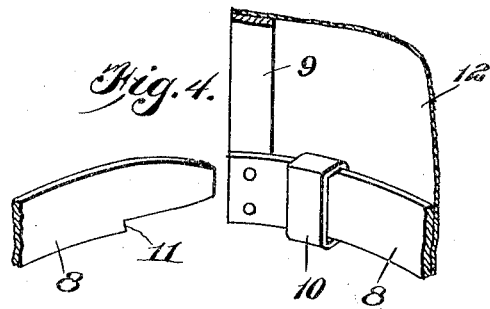
Inventor
Harvey Ireland
By C. C. Hines,
Attorney H. IRELAND.
CROP CAP OR COVER.
APPLICATION FILED NOV. 7, 1918.
1,321,747.
Patented Nov. 11, 1919.
2 SHEETS—SHEET 2.
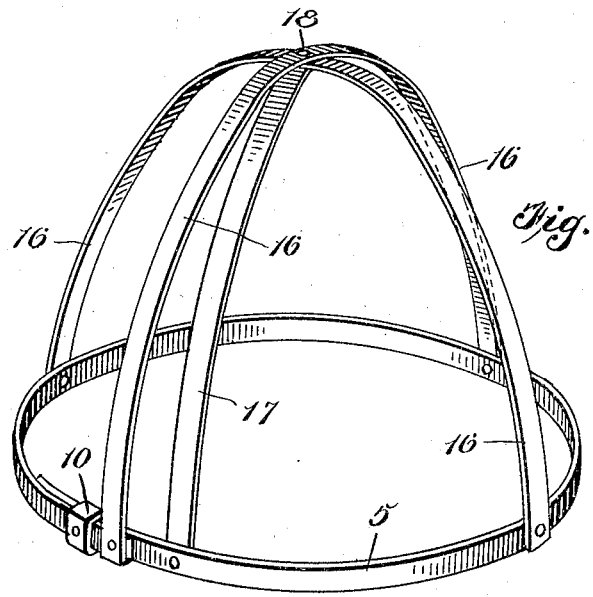
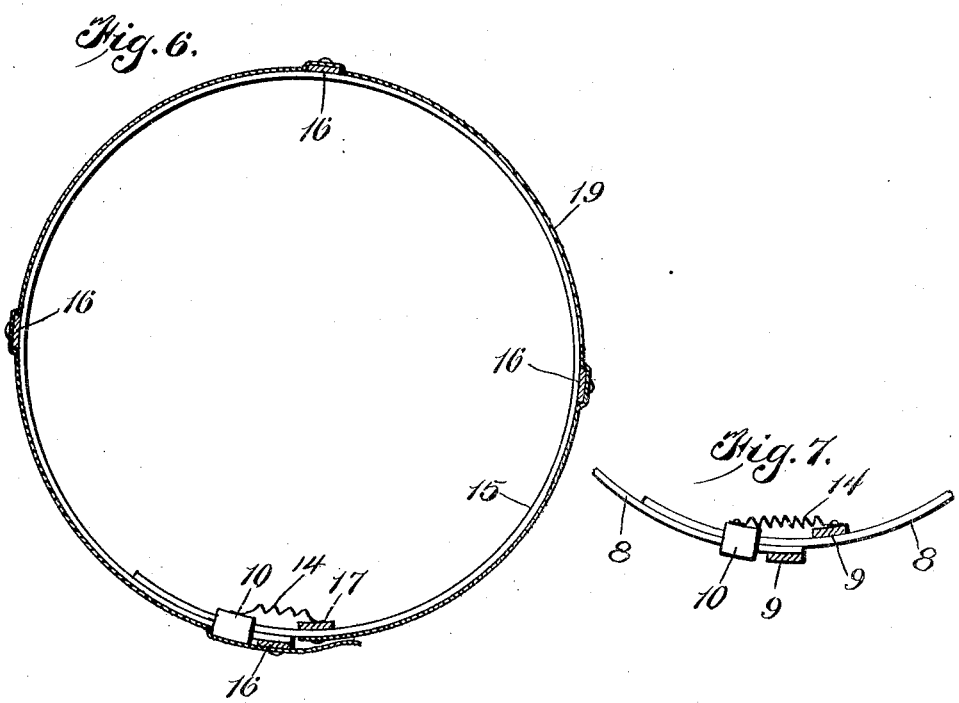
Inventor
Harvey Ireland
By C. C. Hines,
Attorney

UNITED STATES PATENT OFFICE.

HARVEY IRELAND, OF NORTH EMPORIA, VIRGINIA.

CROP CAP OR COVER.

1,321,747.     Specification of Letters Patent.     Patented Nov. 11, 1919.

Application filed November 7, 1918. Serial No. 261,490.

*To all whom it may concern:*

Be it known that I, HARVEY IRELAND, a citizen of the United States, residing at North Emporia, in the county of Greensville and State of Virginia, have invented new and useful Improvements in Crop Caps or Covers, of which the following is a specification.

This invention relates to improved crop caps or covers and has for its primary object to generally simplify and improve the construction and operation of such devices as well as to increase their efficiency.

A further object of the invention is to provide a crop cap which may be manufactured and transported at extremely low cost, and which may be readily applied to or removed from the crop or shock without injuring, distorting or deranging the latter.

A further object of the invention is to provide a device of the character stated which is of such construction as to snugly engage a growing plant or a shock to protect the latter, and which can not be readily blown from the plant or shock which it incloses.

A still further and particular object of the invention is to provide covers of the character mentioned which will prove highly practical and efficient in use and which may be nested so as to enable a great many of such covers to be stored or transported in a small amount of space.

A further object is to provide a cover which normally is in clamping position, and which is provided with improved means for holding the cover expanded, whereby the operation of applying the cover to the plant or shock may be greatly facilitated.

With these objects in view, together with others which will appear as the description proceeds, the invention resides in the novel construction, combination and arrangement of parts, all as will be described more fully hereinafter, illustrated in the drawings, and particularly pointed out in the claims.

In the drawings:—

Figure 1 is a perspective view of a cover constructed in accordance with the invention and as it will appear when applied to a plant, Fig. 2 is a longitudinal sectional view taken through the cover shown in Fig. 1, Fig. 3 is a transverse sectional view taken through the cover, Fig. 4 is an enlarged detail fragmentary perspective view illustrating the manner in which the open rings constituting a part of the cover are constructed, Fig. 5 is a detail perspective view of a shock cover of slightly modified form, Fig. 6 is a transverse sectional view taken through the cap or cover illustrated in Fig. 5, and illustrating the parts in the position they will assume when the cap is applied to a shock, and Fig. 7 is a detail fragmentary sectional view illustrating a further modification.

The cover illustrated in Figs. 1 to 4 inclusive is designed more particularly to be used in connection with growing plants, such as peanuts, beans, etc., and is particularly applicable to such growing plants as have poles or supporting sticks used in connection therewith. In this form of the invention the capper or cover comprises spaced open rings 8, and these rings are connected by suitable bars indicated at 9. The ring at the lower end of the cap will be appreciably larger than the ring at the opposite end, and it is preferred that the body be of such dimensions as to wholly inclose the plant but will not grip the same sufficiently tight to cause injury. The ring 8 at the upper end of the cap need only be so large as to permit of the pole or other plant support protruding therethrough.

The rings at the upper and lower ends of the cover are, as has been stated above, open, and one end of each ring carries a loop 10 to receive the adjacent end of the ring. The said adjacent end is provided with a notch or shoulder 11 designed to engage with the loop 10 to hold the cap in expanded position. The tendency of the rings 8 is to close and to assume the position shown in Figs. 2 and 3, and it is obvious that when the notches 11 are disengaged from their respective loops the parts will assume such positions. When, however, it is desired to apply the cap to a plant or to remove it therefrom the rings are expanded with the hands, until the notches 11 engage with their respective loops. The tendency of the rings to contract will cause the notches to lock with the loops, whereby the frame will be held in expanded position. The frames are covered with suitable fabric indicated at 12, and it will be understood, of course, that this fabric will be open at one side throughout the entire length of the cap. This open side of the fabric is positioned at the open ends of the rings, and a flap 13 may be provided at one end of the fabric to overlie the adjacent or opposite edge of the fabric, whereby an open seam in the fabric is obviated. The fabric may be secured to the rings and bars in any approved manner.

In instances where the plant or shock with which the cap is to be used is of small size it may not be found necessary to open or expand the cover in applying the latter thereto, as it may be dropped over the top of the plant. The pole supporting the plant may protrude through the upper end of the cover, and the lower end of the cover may rest upon the ground. The plant is thus securely housed and protected from injury by the elements. In other instances it may be found necessary to slightly expand the cover before applying the same to the plant, and this may be readily done as is understood by opening the rings until the notches 11 are engaged with the loops 10. It will be understood, therefore, that these rings will be held in slightly expanded position until the notches are disengaged from their respective loops. If necessary, the cap may be expanded to such extent that the ends of the rings 8 will be disengaged from each other, and the resiliency of these rings or their tendency to contract when released will cause the cover to snugly fit upon the plant after proper application is made.

It is preferred that the rings 8 be of spring metal, however the invention is not necessarily restricted to the use of such material. In Fig. 7 I have illustrated means whereby bands of thin wood may equally as well be used. In this form of the invention the bands, indicated at 8, are open rings, and are connected to each other by the bars or rods 9. The open ends of the rings are connected by contractile springs 14, and these springs possess sufficient strength to pull the ends of the bands together when the latter are released.

In Figs. 5 and 6 of the drawings I have shown a slightly modified form of the invention, wherein the cover for shocks or mows, etc., embodies but a single contractile ring. In this form of the invention, the contractile ring is indicated at 15 and has attached thereto at a number of points in its circumference the ends of elastic straps or band members 16. These members 16 are arched and connected at their opposite ends with the ring preferably at diametrically opposite points therein. The members 16 are of such length as to extend over the top of a shock or mow when the open ring 16 is positioned upon the ground encircling the mow or shock. To permit of the ring 15 being expanded, a bar 17 is connected at one end to the ring near one of the ends thereof, and is pivoted as at 18 to the bands 16 at their point of crossing at the top of the cap. This particular arrangement of the bar will permit the ends of the ring being moved relatively to each other, and will lend strength to the structure. The loop and notch construction at the ring ends is the same as has been described in connection with the cover shown in Figs. 1 to 4 inclusive. The frame illustrated in Fig. 5 will, in practice, be covered with fabric 19, as shown in Fig. 6.

From the foregoing it is obvious that I have provided a cap or cover for growing plants, shocks or mows of extremely simple construction and readily applicable to the plants, etc., to be protected. After once being applied, the crop covered will be fully protected against wind, rain, dust, etc.

While the above is the preferred embodiment of the invention it is to be understood that the invention is not necessarily restricted thereto, as various changes in the details of construction may be resorted to without departing from the spirit of the invention as defined by the claims.

I claim:—

1. A capper comprising a frame including an open contractile ring adapted to inclose a plant or shock, a loop member for inclosing the open ends of the ring, and the said ring having a notch upon one end thereof to engage said loop to hold the ring in expanded position.

2. A capper comprising a pair of open contractile rings, bars connecting said rings, a cover extending from one ring to the other and inclosing said bars, and means for holding said rings in expanded position.

3. A capper comprising a pair of open contractile rings, bars connecting said rings, loops inclosing the ends of said rings, and each of said rings having a notch for engagement with said loops.

4. A capper comprising contractile rings varying in size, bars connecting said rings, the ends of said rings being inclosed by loops, and said ring ends having notches thereon to engage said loops to maintain said rings in expanded position.

5. A capper comprising a body formed of a pair of open contractile rings, means for holding said rings expanded, bars connecting said rings, and a fabric inclosing said rings and bars and being open throughout the length of the capper at the open ring side.

6. A capper comprising a frame including an open ring, a loop on one end of said ring, a notch on the other end of said ring to engage said loop, and a contractile spring connecting the ends of said ring.

In testimony whereof I affix my signature.

HARVEY IRELAND.